United States Patent
Shiono

(10) Patent No.: US 11,091,577 B2
(45) Date of Patent: Aug. 17, 2021

(54) NITRILE GROUP-CONTAINING HIGHLY SATURATED COPOLYMER RUBBER

(71) Applicant: ZEON CORPORATION, Tokyo (JP)

(72) Inventor: Atsuhiro Shiono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/574,656

(22) PCT Filed: May 19, 2016

(86) PCT No.: PCT/JP2016/064874
§ 371 (c)(1),
(2) Date: Nov. 16, 2017

(87) PCT Pub. No.: WO2016/190213
PCT Pub. Date: Dec. 1, 2016

(65) Prior Publication Data
US 2018/0134831 A1 May 17, 2018

(51) Int. Cl.
| | | |
|---|---|---|
| *C08L 9/02* | (2006.01) | |
| *C08L 15/00* | (2006.01) | |
| *C08C 19/02* | (2006.01) | |
| *C08F 8/04* | (2006.01) | |
| *C08F 236/12* | (2006.01) | |
| *C08K 5/14* | (2006.01) | |
| *C08F 236/04* | (2006.01) | |
| *C08F 236/06* | (2006.01) | |
| *C08F 236/08* | (2006.01) | |
| *C08F 220/44* | (2006.01) | |
| *C08L 19/00* | (2006.01) | |
| *C08F 220/42* | (2006.01) | |
| *C08F 220/18* | (2006.01) | |
| *C08K 5/00* | (2006.01) | |

(52) U.S. Cl.
CPC ............ *C08F 236/12* (2013.01); *C08C 19/02* (2013.01); *C08F 8/04* (2013.01); *C08F 220/18* (2013.01); *C08F 220/42* (2013.01); *C08F 220/44* (2013.01); *C08F 236/04* (2013.01); *C08F 236/06* (2013.01); *C08F 236/08* (2013.01); *C08K 5/0025* (2013.01); *C08L 9/02* (2013.01); *C08L 15/005* (2013.01); *C08L 19/00* (2013.01); *C08F 2800/20* (2013.01); *C08F 2810/20* (2013.01)

(58) Field of Classification Search
CPC .. C08L 9/02; C08L 15/005; C08F 8/04; C08F 220/18; C08F 220/281; C08F 236/06; C08F 236/08; C08F 236/12; C08C 19/02
See application file for complete search history.

(56) References Cited

U.S. PATENT DOCUMENTS

| 4,503,196 A | 3/1985 | Rempel et al. |
|---|---|---|
| 2004/0097660 A1* | 5/2004 | Bender ................. C08C 19/02 525/329.1 |
| 2011/0301300 A1 | 12/2011 | Iizuka |
| 2015/0225618 A1* | 8/2015 | Sakamoto ............... C08J 5/124 428/519 |

FOREIGN PATENT DOCUMENTS

| CN | 102300882 A | 12/2011 |
|---|---|---|
| EP | 0471250 A1 | 2/1992 |
| EP | 2392599 A1 | 12/2011 |
| EP | 2660285 A1 | 11/2013 |
| GB | 1558491 A | 1/1980 |
| JP | 2004-506087 A | 2/2004 |
| JP | 2012-057111 A | 3/2012 |
| WO | 02/16441 A1 | 2/2002 |
| WO | WO 2014/034698 A1 * | 3/2014 |

OTHER PUBLICATIONS

Jul. 19, 2016 International Search Report issued in International Patent Application No. PCT/JP2016/064874.
Nov. 28, 2017 International Preliminary Report on Patentability issued in International Patent Application No. PCT/JP2016/064874.
Feb. 13, 2020 Office Action issued in Indian Patent Application No. 201717040966.
Nov. 13, 2019 Office Action issued in Russian Patent Application No. 2017140070/04(069627).
Mar. 3, 2020 Office Action issued in Brazilian Patent Application No. BR112017024903.
Jul. 7, 2020 Office Action issued in Russian Patent Application No. 2017140070/04(069627).
2014 Zeon Product Guide, 16 pages.
N. Emori et al., "New Polymer Technology for 05 Hydrogenated Acrylonitrile-Butadiene Rubber," Rohstoffe Und Anwendungen Raw Matrerials and Applications, pp. 432-435, Oct. 2010.
Jun. 18, 2020 Office Action issued in European Patent Application No. 16799919.2.
Mar. 25, 2021 Hearing Notice issued in Indian Patent Application No. 201717040966.
May 6, 2021 Communication issued in European Patent Application No. 16 799 919.2.

* cited by examiner

*Primary Examiner* — Vu A Nguyen
(74) *Attorney, Agent, or Firm* — Oliff PLC

(57) ABSTRACT

The present invention provides a nitrile group-containing highly saturated copolymer rubber comprising an α,β-ethylenically unsaturated nitrile monomer unit in a content of 15 wt % or more and less than 28 wt %, an α,β-ethylenically unsaturated monocarboxylic acid ester monomer unit (b) in a content of 10 to 50 wt %, and a conjugated diene monomer unit (c) in a content of 22 to 75 wt %, and having an iodine value of 120 or less, wherein the conjugated diene monomer unit (c) is at least partially hydrogenated, and a proportion of an isoprene unit in the conjugated diene monomer unit (c) is 33 wt % or more.

9 Claims, No Drawings

NITRILE GROUP-CONTAINING HIGHLY SATURATED COPOLYMER RUBBER

TECHNICAL FIELD

The present invention relates to a nitrile group-containing highly saturated copolymer rubber, and more particularly, to a nitrile group-containing highly saturated copolymer rubber capable of giving a cross-linked rubber excellent in cold resistance, resistance to swelling in oil, and resistance to hardening in oil.

BACKGROUND ART

A nitrile group-containing highly saturated copolymer rubber typified by a hydrogenated acrylonitrile-butadiene copolymer rubber is excellent in heat resistance, resistance, ozone resistance and the like as compared with a common nitrile group-containing copolymer rubber such as an acrylonitrile-butadiene copolymer rubber, having a plenty of carbon-carbon unsaturated bonds in the main chain structure thereof. However, on the other hand, a nitrile group-containing highly saturated copolymer rubber is sometimes inferior in cold resistance as compared with a nitrile group-containing copolymer rubber, depending on the nitrile group content or the proportion of the unsaturated bonds in the carbon-carbon bonds of the nitrile group-containing highly saturated copolymer rubber.

In view of such a situation, Patent Document 1 has proposed a nitrile group-containing highly saturated copolymer rubber, comprising unsaturated nitrile monomer units, butadiene monomer units and isoprene monomer unit, with a molar ratio between the butadiene monomer unit and the isoprene monomer unit of 3:1 or less. However, a cross-linked rubber obtained by using the nitrile group-containing highly saturated copolymer rubber described in Patent Document 1 is not sufficient in oil resistance although the hardening in oil and cold resistance have been improved to sane extents.

RELATED ART

Patent Documents

Patent Document 1: National Publication of International Patent Application No. 2004-506087

SUMMARY OF THE INVENTION

Problem to be Solved by the Invention

The present invention was made in view of such a circumstance, and relates to a nitrile group-containing highly saturated copolymer rubber capable of giving a cross-linked rubber excellent in cold resistance, resistance to swelling in oil (small volume change in oil), and resistance to hardening in oil (small hardness change in an oil containing a condensed aromatic compound).

Means for Solving the Problem

The present inventors engaged in a diligent study to achieve the above objects and consequently have perfected the present invention by discovering that the above object can be achieved by setting the proportion of the isoprene unit in a conjugated diene monomer unit to be 33 wt % or more in a nitrile group-containing highly saturated copolymer rubber comprising an $\alpha,\beta$-ethylenically unsaturated nitrile monomer unit in a content of 15 wt % or more and less than 28 wt %, an $\alpha,\beta$-ethylenically unsaturated monocarboxylic acid ester monomer unit in a content of 10 to 50 wt %, and the conjugated diene monomer unit in a content of 22 to 75 wt %, and having an iodine value of 120 or less.

In other words, the present invention provides a nitrile group-containing highly saturated copolymer rubber comprising an $\alpha,\beta$-ethylenically unsaturated nitrile monomer unit (a) in a content of 15 wt % or more and less than 28 wt %, an $\alpha,\beta$-ethylenically unsaturated monocarboxylic acid ester monomer unit (b) in a content of 10 to 50 wt %, and a conjugated diene monomer unit (c) in a content of 22 to 75 wt %, and having an iodine value of 120 or less, wherein the conjugated diene monomer unit (c) is at least partially hydrogenated, and a proportion of an isoprene unit in the conjugated diene monomer unit (c) is 33 wt % or more.

The nitrile group-containing highly saturated copolymer rubber of the present invention preferably comprises an isoprene unit and a 1,3-butadiene unit as the conjugated diene monomer unit (c).

The nitrile group-containing highly saturated copolymer rubber of the present invention preferably further comprises a carboxyl group-containing monomer unit (d).

In the nitrile group-containing highly saturated copolymer rubber of the present invention, the carboxyl group-containing monomer unit (d) is preferably an $\alpha,\beta$-ethylenically unsaturated dicarboxylic acid monoester monomer unit.

In the nitrile group-containing highly saturated copolymer rubber of the present invention, the $\alpha,\beta$-ethylenically unsaturated monocarboxylic acid ester monomer unit (b) is preferably a (meth)acrylic acid ester having an alkyl group having 1 to 18 carbon atoms.

In the nitrile group-containing highly saturated copolymer rubber of the present invention, the $\alpha,\beta$-ethylenically unsaturated monocarboxylic acid ester monomer unit (b) is preferably a (meth)acrylic acid ester having an alkoxyalkyl group having 2 to 18 carbon atoms.

The present invention also provides a cross-linkable rubber composition comprising the nitrile groom-containing highly saturated copolymer rubber and a cross-linking agent.

The present invention also provides a cross-linked rubber obtained by cross-linking the cross-linkable rubber composition.

Effects of Invention

The present invention can provide a nitrile group-containing highly saturated copolymer rubber capable of giving a cross-linked rubber excellent in cold resistance, resistance to swelling in oil (small volume change in oil), and resistance to hardening in oil (small hardness change in an oil containing a condensed aromatic compound), and a cross-linked rubber obtained by using such a nitrile group-containing highly saturated copolymer rubber and excellent in cold resistance, resistance to swelling in oil and resistance to hardening in oil.

DESCRIPTION OF EMBODIMENTS

Nitrile Group-Containing Highly Saturated Copolymer Rubber

A nitrile group-containing highly saturated copolymer rubber comprising an $\alpha,\beta$-ethylenically unsaturated nitrile monomer unit (a) in a content of 15 wt % or more and less than 28 wt %, an $\alpha,\beta$-ethylenically unsaturated monocarboxylic acid ester monomer unit (b) in a content of 10 to 50 wt %, and a conjugated diene monomer unit (c) in a content of 22 to 75 wt %, and having an iodine value of 120 or less, wherein the conjugated diene monomer unit (c) is at least partially hydrogenated, and a proportion of an isoprene unit in the conjugated diene monomer unit (c) is 33 wt % or more.

The α,β-ethylenically unsaturated nitrile monomer forming the α,β-ethylenically unsaturated nitrile monomer unit (a) is not particularly limited so long as the α,β-ethylenically unsaturated nitrile monomer is an α,β-ethylenically unsaturated compound having a nitrile group. For example, acrylonitrile; α-halogenoacrylonitriles such as α-chloroacrylonitrile and α-bromoacrylonitrile; α-alkylacrylonitriles such as methacrylonitrile and ethacrylonitrile, etc. may be mentioned. Among these, acrylonitrile and methacrylonitrile are preferable, and acrylonitrile is particularly preferable. The α,β-ethylenically unsaturated nitrile monomers may be used as single types alone or as a plurality of types combined.

The content of the α,β-ethylenically unsaturated nitrile monomer unit. (a) in the nitrile group-containing highly saturated copolymer rubber of the present invention is 15 wt % or more and less than 28 wt %, preferably 18 wt % or more and less than 28 wt %, and more preferably 20 wt or more and less than 28 wt %, in all the monomer units. When the content of the α,β-ethylenically unsaturated nitrile monomer unit (a) is too small, the resistance to swelling in oil of the obtained cross-linked rubber decreases. On the other hand, when the content of the α,β-ethylenically unsaturated nitrile monomer unit (a) is too large, the cold resistance of the obtained cross-linked rubber decreases.

As the α,β-ethylenically unsaturated monocarboxylic acid ester monomer forming the α,β-ethylenically unsaturated monocarboxylic acid ester monomer unit (b), (meth)acrylic acid esters (abbreviations for "methacrylic acid esters and acrylic acid esters," and the same shall apply hereinafter) each having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; (meth)acrylic acid esters each having an alkoxyalkyl group having 2 to 18 carbon atoms such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid esters each having a cyanoalkyl group having 2 to 12 carbon atoms such as α-cyanoethyl acrylate, α-cyanoethyl methacrylate, and cyanobutyl methacrylate; (meth)acrylic acid esters each having a hydroxyalkyl group having 1 to 12 carbon atoms such as 2-hydroxyethyl acrylate, 2-hydroxypropyl acrylate, and 2-hydroxyethyl methacrylate; and (meth)acrylic acid esters each having a fluoroalkyl group having 1 to 12 carbon atoms such as trifluoroethyl acrylate and tetrafluoropropyl methacrylate, etc. may be mentioned.

Among these, from the viewpoint of being capable of further increasing the cold resistance and the resistance to swelling in oil of the obtained cross-linked rubber, the (meth)acrylic acid esters each having an alkyl group having 1 to 18 carbon atoms, and the (meth)acrylic acid esters each having an alkoxyalkyl group having 2 to 18 carbon atoms are preferable, and n-butyl acrylate and methoxyethyl methacrylate are particularly preferable. From the viewpoint of being capable of particularly increasing the resistance to swelling in oil, the (meth)acrylic acid esters each having an alkyl group having 1 to 18 carbon atoms are preferable, and from the viewpoint of being capable of particularly increasing the cold resistance, the (meth)acrylic acid esters each having an alkoxyalkyl group having 2 to 18 carbon atoms are preferable. The α,β-ethylenically unsaturated monocarboxylic acid ester monomers may be used as single types alone or as a plurality of types combined.

In the nitrile group-containing highly saturated copolymer rubber of the present invention, the content of the α,β-ethylenically unsaturated monocarboxylic acid ester monomer unit (b) is 10 to 50 wt %, preferably 15 to 45 wt %, and more preferably 20 to 40 wt %, in all the monomer units. When the content of the α,β-ethylenically unsaturated monocarboxylic acid ester monomer unit (b) is too small, the cold resistance of the obtained cross-linked rubber decreases. On the other hand, when the content of the α,β-ethylenically unsaturated monocarboxylic acid ester monomer unit (b) is too large, the resistance to swelling in oil decreases.

As the conjugated diene monomer forming the conjugated diene monomer unit (c), 1,3-butadiene, isoprene, 2,3-dimethyl-1,3-butadiene, 1,3-pentadiene, etc. may be mentioned.

In the nitrile group-containing highly saturated copolymer rubber of the present invention, the content of the conjugated diene monomer unit (c) is 22 to 75 wt %, preferably 25 to 65 wt %, and more preferably 35 to 55 wt %, in all the monomer units. When the content of the conjugated diene monomer unit (c) is too small, the obtained cross-linked rubber is inferior in rubber elasticity, and on the other hand, when the content of the conjugated diene monomer unit (c) is too large, the heat resistance and the chemical stability of the obtained cross-linked rubber are impaired. Note that in the nitrile group-containing highly saturated copolymer rubber of the present invention, the conjugated diene monomer unit (c) is included at least partially in a hydrogenated state, and the above content is a content including that of the conjugated diene monomer unit (c) included in the hydrogenated state.

The nitrile group-containing highly saturated copolymer rubber of the present invention includes at least an isoprene unit as the conjugated diene monomer unit (c), and moreover, the content of the isoprene unit in the conjugated diene monomer unit (c) is within a range of 33 wt % or more, preferably 33 wt % or more and 85 wt % or less, and more preferably 33 wt % or more and 75 wt % or less. Note that in the nitrile group-containing highly saturated copolymer rubber of the present invention, the isoprene unit is also included at least partially in a hydrogenated state, and hence the above content is a content including that of the isoprene unit included in the hydrogenated state. According to the present invention, by setting the content of the isoprene unit in the conjugated diene monomer unit (c) within the above range, it is possible to make the obtained cross-linked rubber small in the hardness change in an oil containing a condensed aromatic compound, that is, excellent in the resistance to hardening in oil, while making the obtained cross-linked rubber good in the cold resistance and the resistance to swelling in oil. On the other hand, when the content of the isoprene unit is too small, the obtained cross-linked rubber is inferior in the resistance to hardening in oil, and large in the hardness change in the oil containing a condensed aromatic compound.

Note that the nitrile group-containing highly saturated copolymer rubber of the present invention may be any nitrile group-containing highly saturated copolymer rubber that includes the isoprene unit within the above-mentioned range as the conjugated diene monomer unit (c); the nitrile group-containing highly saturated copolymer rubber of the present invention may include only the isoprene unit as the conjugated diene monomer unit (c), or may include the isoprene unit and a unit composed of one or two or more conjugated diene monomers other than the isoprene unit as the conjugated diene monomer unit (c). In particular, from the viewpoint that the obtained cross-linked rubber can be made better in the balance between the resistance to hardening in oil and the cold resistance, the nitrile group-containing highly saturated copolymer rubber preferably includes as the conjugated diene monomer unit (c) the isoprene unit and the unit composed of one or two or more conjugated diene monomers other than the isoprene unit, and more preferably includes the isoprene unit and the 1,3-butadiene unit.

In the case where the unit composed of the conjugated diene monomer(s) other than the isoprene unit is included as the conjugated diene monomer unit (c), the content of the unit composed of the conjugated diene monomer(s) other than the isoprene unit in the conjugated diene monomer unit (c) is preferably 0 wt % or more, more preferably 15 wt % or more, and still more preferably 25 wt % or more. In other words, the upper limit of the content of the isoprene unit in the conjugated diene monomer unit (c) is preferably 100 wt % or less, more preferably 85 wt % or less, and still more preferably 75 wt % or less.

The nitrile group-containing highly saturated copolymer rubber of the present invention may also include a carboxyl group-containing monomer unit (d) in addition to the α,β-ethylenically unsaturated nitrile monomer unit (a), the α,β-ethylenically unsaturated monocarboxylic acid ester monomer unit (b), and the conjugated diene monomer unit (c). By including the carboxyl group-containing monomer unit (d), the compression set resistance of the obtained cross-linked rubber can be increased.

The carboxyl group-containing monomer forming the carboxyl group-containing monomer unit (d) is not particularly limited so long as the monomer concerned is a monomer being copolymerizable with the α,β-ethylenically unsaturated nitrile monomer and having one or more unsubstituted (free) carboxyl groups which is not esterified etc. By using a carboxyl group-containing monomer, carboxyl groups can be introduced into the nitrile group-containing highly saturated copolymer rubber of the present invention.

As the carboxyl group-containing monomer used in the present invention, an α,β-ethylenically unsaturated monocarboxylic acid monomer, an α,β-ethylenically unsaturated polyvalent carboxylic acid monomer, an α,β-ethylenically unsaturated dicarboxylic acid monoester monomer, etc. may be mentioned. The carboxyl group-containing monomers also include the monomers in which the carboxyl groups of these monomers form carboxylic acid salts. Moreover, the anhydride(s) of the α,β-ethylenically unsaturated polyvalent carboxylic acid forms a carboxyl group(s) by cleaving the acid anhydride group(s) after copolymerization, and hence can be used as a carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, butenedioic acids such as fumaric acid and maleic ac and itaconic acid, citraconic acid, mesaconic acid, glutaconic acid, allylmalonic acid, teraconic acid, etc. may be mentioned. As the anhydride of the α-β-unsaturated polyvalent carboxylic acid, maleic anhydride, itaconic anhydride, citraconic anhydride, etc. may be mentioned.

As the α,β-ethylenically unsaturated dicarboxylic acid monoester monomer, maleic acid monoalkyl ester such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleic acid; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate, fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monocyclopentyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monoocyclohexyl itaconate, and monocycloheptyl itaconate; itaconic acid monoalkyl cycloalkyl esters such as mono methyl cyclopentyl itaconate, and monoethyl cyclohexyl itaconate; etc. may be mentioned.

The carboxyl group-containing monomers may be used as single types alone or as a plurality of types combined. Among the carboxyl group-containing monomers, from the viewpoint of being able to make the improvement effect of the compression set resistance more remarkable, the α,β-ethylenically unsaturated dicarboxylic acid monoester monomer is preferable, the α,β-ethylenically unsaturated dicarboxylic acid monoalkyl ester monomer is more preferable, the maleic acid monoalkyl ester is further preferable, and mono-n-butyl maleate is particularly preferable.

The content of the carboxyl group-containing monomer unit (d) in the nitrile group-containing highly saturated copolymer rubber of the present invention, in the case of including the carboxyl group-containing monomer unit (d), is preferably 0 to 10 wt. %, more preferably 2 to 9 wt %, and still more preferably 3 to 8 wt %, all the monomer units. By setting the content of the carboxyl group-containing monomer unit (d) within the above-mentioned range, it is possible to more suitably increase the compression set resistance of the obtained cross-linked rubber.

The nitrile group-containing highly saturated copolymer rubber of the present invention may also include, in addition to the α,β-ethylenically unsaturated nitrile monomer unit (a), the α,β-ethylenically unsaturated monocarboxylic acid ester monomer unit (b), and the conjugated diene monomer unit (c), and the carboxyl group-containing monomer unit (d) used if necessary, other monomer units copolymerizable with the monomers forming these. As such other monomers, ethylene, an α-olefin monomer, an aromatic vinyl monomer, a fluorine-containing vinyl monomer, a copolymerizable antiaging agent, etc. may be mentioned.

The α-olefin monomer preferably has 3 to 12 carbon atoms, and, for example, propylene, 1-butene, 4-methyl-1-pentene, 1-hexene, and 1-octene, etc. may be mentioned.

As the aromatic vinyl monomer, styrene, α-methylstyrene, vinylpyridine, etc. may be mentioned.

As the fluorine-containing vinyl monomer, fluoroethyl vinyl ether, fluoropropyl vinyl ether, o-trifluoromethylstyrene, vinyl pentafluorobenzoate, difluoroethylene, tetrafluoroethylene, etc. may be mentioned.

As the copolymerizable antiaging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

The content of the copolymerizable other monomer unit(s) in the nitrile group-containing highly saturated copolymer rubber of the present invention is preferably 50 wt % or less, more preferably 40 wt % or less, and still more preferably 10 wt % or less, in all the monomer units.

The iodine value in the nitrile group-containing highly saturated copolymer rubber of the present invention is 120 or less, preferably 80 or less, more preferably 60 or less, and particularly preferably 50 or less. When the iodine value is too high, the heat resistance and the ozone resistance of the obtained cross-linked rubber are liable to decrease.

The polymer Mooney viscosity ($ML_{1+4}$, 100° C.) of the nitrile group-containing highly saturated copolymer rubber of the present invention is preferably 10 to 200, more preferably 15 to 150, still more preferably 15 to 100, and particularly preferably 30 to 90. The polymer Mooney viscosity being 10 or more results in good mechanical properties of the obtained cross-linked rubber. In addition, the polymer Mooney viscosity being 200 or less results in a good processability in the case where a cross-linkable rubber composition is prepared by adding a cross-linking agent.

The method for producing the nitrile group-containing highly saturated copolymer rubber of the present invention is not particularly limited, but it is possible to produce it by copolymerizing the above-mentioned monomers and hydrogenating the carbon-carbon double bonds in the obtained copolymer. The polymerization method is not particularly limited and a known emulsion polymerization method or solution polymerization method may be used, but the emulsion polymerization method is preferable from the viewpoint of the industrial productivity. At the time of the emulsion polymerization, in addition to the emulsifier, a polymerization initiator, and a molecular weight adjuster, polymerization auxiliary materials usually used can be used.

The emulsifier is not particularly limited, but, for example, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzene sulfonate, higher alcohol sulfuric acid ester salts, and alkyl sulfosuccinic acid salts; and copolymerizable emulsifiers such as sulfa esters of α,β-unsaturated carboxylic acids, sulfate esters of α,β-unsaturated carboxylic acids, sulfoalkylaryl ethers, etc. may be mentioned. The amount of addition of the emulsifier is preferably 0.1 to 10 parts by weight and more preferably 0.5 to 5 parts by weight in relation to 100 parts by weight of the monomer used for the polymerization.

The polymerization initiator is not particularly limited so long as the polymerization initiator is a radical initiator. For example, inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; etc. may be mentioned. These polymerization initiators can be used alone or as two or more types combined. As the polymerization initiator, an inorganic or organic peroxide is preferable. When a peroxide is used as a polymerization initiator, the peroxide can be used in combination with a reducing agent such as sodium bisulfite or ferrous sulfate as a redox-type polymerization initiator. The amount of addition of the polymerization initiator is preferably 0.01 to 2 parts by weight, in relation to 100 parts by weight of the monomers used for the polymerization.

The molecular weight adjuster is not particularly limited. For example, mercaptans such as t-dodecyl mercaptan, n-dodecyl mercaptan, and octyl mercaptan; halogenated hydrocarbons such as carbon tetrachloride, methylene chloride, and methylene bromide; α-methylstyrene dimer; sulfur-containing compounds such as tetraethylthiuram disulfide, dipentamethylenethiuram disulfide, and diisopropyl xanthogen disulfide, etc. may be mentioned. These may be used alone or as two or more types combined. Among these, mercaptans are preferable, and t-dodecyl mercaptan is more preferable. The amount of use of the molecular weight adjuster is preferably 0.1 to 0.8 part by weight in relation to 100 parts by weight of all the monomers.

For the medium of emulsion polymerization, usually water is used. The amount of the water is preferably 80 to 500 parts by weight, and wore preferably 80 to 300 parts by weight, in relation to 100 parts by weight of the monomers used for the polymerization.

In the emulsion polymerization, it is possible to further use, if necessary, polymerization auxiliary materials such as a stabilizer, a dispersant, a pH adjuster, a deoxidizer, and a particle size adjuster. When these are used, the types and the amounts used thereof are not particularly limited.

Further, in the present invention, for the obtained copolymer, if necessary, the copolymer may be hydrogenated (hydrogenation reaction). The hydrogenation may be performed on the basis of a known method. An oil layer hydrogenation method in which the latex of the copolymer obtained by emulsion polymerization is coagulated, and then the hydrogenation is performed in the oil layer; and an aqueous layer hydrogenation method in which the latex of the obtained copolymer is hydrogenated as it is, etc. may be mentioned.

When the hydrogenation is performed by the oil layer hydrogenation method, preferably the latex of the copolymer prepared by the emulsion polymerization is coagulated by salting out or by using an alcohol, and the coagulated product is filtered out and dried, and then, dissolved in an organic solvent. Next, a hydrogenation reaction (the oil layer hydrogenation method) is performed, the obtained hydride is poured into a large amount of water to be coagulated, the coagulated product is filtered out and dried, and thus the nitrile group-containing highly saturated copolymer rubber of the present invention can be obtained.

For the coagulation of the latex by salting out, a known coagulant such as sodium chloride, calcium chloride, or aluminum sulfate can be used. Further, instead of the coagulation by salting out, the coagulation may also be performed by using an alcohol such as methanol. The solvent for the oil layer hydrogenation method is not particularly limited so long as the solvent is a liquid organic compound dissolving the copolymer obtained by emulsion polymerization; however, as such a solvent, preferably used are benzene, chlorobenzene, toluene, xylene, hexane, cyclohexane, tetrahydrofuran, methyl ethyl ketone, ethyl acetate, cyclohexanone and acetone.

As the catalyst of the oil layer hydrogenation method, any known selective hydrogenation catalyst can be used without particular limitation; a palladium-based catalyst and a rhodium-based catalyst are preferable, and a palladium-based catalyst (such as palladium acetate, palladium chloride and palladium hydroxide) are more preferable. These may be us as two or more types combined; however, in such a case, it is preferable to use a palladium-based catalyst as the main active component. These catalysts are usually used as carried on carriers. As the carrier, silica, silica-alumina, alumina, diatomaceous earth, activated carbon, etc. may be mentioned. The amount of use of the catalyst is preferably 10 to 20000 ppm by weight and more preferably 100 to 15000 ppm by weight in relation to the copolymer.

Alternatively, when the hydrogenation is performed by the aqueous layer hydrogenation method, the hydrogenation reaction is performed by adding water to and diluting, if necessary, the latex of the copolymer prepared by the emulsion polymerization. The aqueous layer hydrogenation method includes an aqueous layer direct hydrogenation method in which the latex is hydrogenated by supplying hydrogen to the reaction system in the presence of a hydrogenation catalyst, and an indirect aqueous layer hydrogenation method in which the latex is hydrogenated by reducing the latex in the presence of an oxidizing agent, a reducing agent and an activating agent. Of these two methods, the aqueous layer direct hydrogenation method is preferable.

In the aqueous layer direct hydrogenation method, the concentration of the copolymer in the aqueous layer (concentration in latex state) is preferably 40 wt % or less, in order to prevent the aggregation. The hydrogenation catalyst is not particularly limited so long as the catalyst is a compound being hardly decomposed by water. As specific examples, among palladium catalysts, as palladium salts of carboxylic acids such as formic acid, propionic acid, lauric acid, succinic acid, oleic acid, and phthalic acid; palladium chlorides such as palladium chloride, dichloro(cyclooctadiene)palladium, dichloro(norbornadiene)palladium, and ammonium hexachloropalladate (IV); iodides such as palladium iodide; palladium sulfated dihydrate, etc. may be mentioned. Among these, the palladium salts of carboxylic acids, dichloro(norbornadiene)palladium, and ammonium hexachloropalladate (IV) are particularly preferable. The amount of use of the hydrogenation catalyst may be appropriately set; however, the amount of use of the hydrogenation catalyst is preferably 5 to 20000 ppm by weight and more preferably 10 to 15000 ppm by weight in relation to the copolymer obtained by polymerization.

In the aqueous layer direct hydrogenation method, after the completion of the hydrogenation reaction, the hydrogenation catalyst in the latex is removed. As the method for removing the hydrogenation catalyst, for example, it is possible to adopt a method in which an adsorbent such as activated carbon or an ion-exchange resin is added to the latex, the hydrogenation catalyst is adsorbed to the adsorbent under stirring, and then the latex is subjected to a filtration or centrifugation. It is also possible not to remove the hydrogenation catalyst so as remain in the latex.

Further, in the aqueous layer direct hydrogenation method, the thus obtained latex after the hydrogenation reaction is salted out to be coagulated, filtered and dried, and subjected to other operations, and thus, the nitrile group-containing highly saturated copolymer rubber of the present invention can be obtained. In this case, the steps of filtration and drying following the step of coagulation can be performed with known methods, respectively.

Cross-Linkable Rubber Composition

The cross-linkable rubber composition of the present invention comprises the nitrile group-containing highly saturated copolymer rubber of the present invention and a cress-linking agent. Note that the cross-linkable rubber composition of the present invention may include two or more types of nitrile group-containing highly saturated copolymer rubbers as the nitrile group-containing highly saturated copolymer rubber of the present invention; for example, nitrile group-containing highly saturated copolymer rubbers different from each other in the types and the contents of the monomer units constituting the nitrile group-containing highly saturated copolymer rubbers can be used in appropriate combinations thereof. As an example, from the viewpoint of achieving a sophisticated balance between the cold resistance and the resistance to swelling in oil, it is possible to carbine a nitrile group containing highly saturated copolymer rubber including a (meth)acrylic acid ester having an alkyl group having 1 to 18 carbon atoms as the $\alpha,\beta$-ethylenically unsaturated monocarboxylic acid ester monomer unit (b), and a nitrile group-containing highly saturated copolymer rubber including a (meth)acrylic acid ester having an alkoxyalkyl group having 2 to 18 carbon atoms as the $\alpha,\beta$-ethylenically unsaturated monocarboxylic acid ester monomer unit (b).

The cross-linking agent is not particularly limited so long as the cross-linking agent can cross-link the nitrile group-containing highly saturated copolymer rubber of the present invention; and, for example, a sulfur-based cross-linking agent, an organic peroxide cross-linking agent, a polyamine-based cross-linking agent, etc. may be mentioned.

As the sulfur-based cross-linking agent, sulfur such as a powdery sulfur, flower of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexzahydro-2H-azepin-2-one), phosphorus-containing polysulfide, and polymeric polysulfide; and sulfur-donating compound such as tetramethyl thiuram disulfide, selenium dimethyl dithiocarbamate, and 2-(4'-morpholinodithio)benzothiazole; etc. may be mentioned. These can be used as single types alone or as a plurality of types combined.

As the organic peroxide crosslinking agent, dicumyl peroxide, cumene hydroperoxide, t-butyl cumyl peroxide, paramenthane hydroperoxide, di-t-butyl peroxide, 1,3-bis(t-butylperoxy isopropyl)benzene, (t-butylperoxy isopropyl) benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxy-hexyne-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These can be used as single types alone or as a plurality of types combined.

The polyamine-based cross-linking agent is not particularly limited so long as the polyamine-based cross-linking agent is a compound having two or more amino groups or a compound becoming a form having two or more amino groups at the time of cross-linking, but however, the polyamine-based cross-linking agent is preferably a compound comprised of an aliphatic hydrocarbon or an aromatic hydrocarbon in which a plurality of hydrogen atoms are substituted with amino groups or hydrazide structures (structures each represented by —CONHNH$_2$, where CO represents a carbonyl group) and a compound becoming the form of the aforementioned compound at the time of cross-linking.

As specific examples of the polyamine-based cross-linking agent, aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adduct; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; etc. may be mentioned. Among these, from the viewpoint of being capable of making the effects of the present invention more remarkable, aliphatic polyvalent amines and the aromatic polyvalent amines are preferable, hexamethylenediamine carbamate and 2,2-bis[4-(4-aminophenoxy)phenyl]propane are more preferable, and hexamethylenediamine carbamate is particularly preferable.

The content of the cross-linking agent cross-linkable rubber composition of the present invention is not particularly limited, but is preferably 0.1 to 20 parts by weight and more preferably 1 to 15 parts by weight, in relation to 100 parts by weight of the nitrile group-containing highly saturated copolymer rubber.

Further, when a polyamine-based cross-linking agent is used as the cross-linking agent, the cross-linkable rubber composition preferably further includes a basic cross-linking accelerator.

As specific examples of the basic cross-linking accelerator, a compound represented by the following general formula (1), a basic cross-linking accelerator having a cyclic amidine structure, a guanidine-based basic cross-linking accelerator, an aldehyde amine-based basic cross-linking accelerator, etc. may be mentioned.

$$R^1-NH-R^2 \quad (1)$$

(In the general formula (1), $R^1$ and $R^2$ axe each independently a substituted or unsubstituted alkyl group having 1 to 14 carbon atoms, or a substituted or unsubstituted cycloalkyl group having 5 to 12 carbon atoms.)

$R^1$ and $R^2$ are each a substituted or unsubstituted alkyl group having 1 to 12 carbon atoms, or a substituted or unsubstituted cycloalkyl group having 5 to 12 carbon atoms, but are each preferably a substituted or unsubstituted cycloalkyl group having 5 to 12 carbon atoms, and particularly preferably a substituted or unsubstituted cycloalkyl group having 5 to 8 carbon atoms.

Further, $R^1$ and $R^2$ each preferably have no substituent.

Note that, as specific examples of the substituents) in the case where $R^1$ and $R^2$ each have a substituent(s), a hydroxyl group, an alkoxy group, an alkoxycarbonyl group, an amino group, a halogen atom, etc. may be mentioned.

Further, among the compounds represented by the above general formula (I), from the viewpoint of being capable of more enhancing the processability and scorch stability, a compound represented by the following general formula (2) is more preferable.

$$R^3-NH-R^4 \quad (2)$$

(In the general formula (2), $R^3$ and $R^4$ are each independently a substituted or unsubstituted cycloalkyl group having 5 to 8 carbon atoms.)

$R^3$ and $R^4$ are each a substituted or unsubstituted cycloalkyl group having 5 to 8 carbon atoms, but are each preferably a substituted or unsubstituted cycloalkyl group having 5 to 6 carbon atoms, and more preferably a substituted or unsubstituted cycloalkyl group having 6 carbon atoms.

Further, $R^3$ and $R^4$ each preferably have no substituent.

Note that as specific examples of the substituent(s) in the case where $R^3$ and $R^4$ each have a substituent(s), a hydroxyl group, an alkoxy group, an alkoxycarbonyl group, an amino group, a halogen atom, etc. may be mentioned.

As specific examples of the compound and represented by the general formula (1), dicycloalkylamines such as dicyclooentylamine, dicyclohexylamine and dicycloheptylamine; secondary amines each having an alkyl group and a cycloalkyl group bonded to the nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines each having a hydroxyl group-containing alkyl group and a cycloalkyl group bonded to the nitrogen atom such as N-hydroxymethylcyclopentylamine and N-hydroxybutylcyclohexylamine; secondary amines each having an alkoxy group-containing alkyl group and a cycloalkyl group bonded to the nitrogen atom such as N-methoxyethylcyclopentylamine and N-ethoxybutylcyclohexylamine; secondary amines each having an alkoxycarbonyl group-containing alkyl group and a cycloalkyl group bonded to the nitrogen atom such as N-methoxycarbonylbutylcyclopentylamine and N-methoxycarbonylheptyloyclohexylamine; secondary amines each having an amino group-containing alkyl group and a cycloalkyl group bonded to the nitrogen atom such as N-aminopropylcyclopentylamine and N-aminoheptylcyclohexylamine; and secondary amines each having a halogen atom-containing cycloalkyl group bonded to the nitrogen atom Such as di(2-chlorocyclopentyl)amine and di(3-chlorocyclopentyl)amine; etc. may be mentioned, but from the viewpoint of being capable of more enhancing the processability and the scorch stability, a dicycloalkylamine is preferable, dicyclopentylamine and dicyclohexylamine are more preferable, and dicyclohexylamine is particularly preferable.

As the basic cross-linking accelerator having a cyclic amidine structure, 1,8-diazabicyclo[5.4.0]undecene-7 (hereinafter, sometimes abbreviated as "DBU"), 1,5-diazabicyclo[4.3.0]nonene-5 (hereinafter, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2- ethoxymethylimidazoline, 1-ethoxymethyl-2-methylimidazoline, etc. may be mentioned. Among these basic cross-linking accelerators each having a cyclic amidine structure, 1,8-diazabicyclo[5.4.0]undecene-7 and 1,5-diazabicyclo[4.3.0]nonene-5 are preferable, and 1,8-diazabicyclo[5.4.0]undecene-7 is more preferable.

As the guanidine-based basic cross-linking accelerator, tetramethylguanidine, tetraethylguanidine, diphenylguanidine, 1,3-di-o-tolylguanidine, o-tolylbiguanide, etc. may be mentioned.

As the aldehyde amine-based basic cross-linking accelerator, n-butylaldehyde aniline, acetaldehyde ammonia, etc. may be mentioned.

Among these basic cross-linking accelerators, a compound represented by the general formula (1), a guanidine-based basic cross-linking accelerator, and a basic cross-linking accelerator having a cyclic amidine structure are preferable, and a compound represented by the general formula (1) and a basic cross-linking accelerator having a cyclic amidine structure are more preferable.

Note that the compound represented by the general formula (1) may be comprised of alcohols such as an alkylene glycol and an alkyl alcohol having 5 to 20 carbon atoms mixed together, and may further contain an inorganic acid and/or an organic acid. Further, as for the compound represented by the general formula (1), the compound represented by the general formula (1) may form a salt(s) with the inorganic acid and/or the organic acid, and further form a complex with an alkylene glycol. Further, the basic cross-linking accelerator having the above cyclic amidine structure may form a salt with a carboxylic acid or an alkyl phosphoric acid, etc.

In the case where the basic cross-linking accelerator is mixed, the amount of the basic cross-linking accelerator in the cross-linkable rubber composition of the present invention is preferably 0.1 to 20 parts by weight, more preferably 0.2 to 15 parts by weight, and still more preferably 0.5 to 10 parts by weight, in relation to 100 parts by weight of the nitrile group-containing highly saturated copolymer rubber.

Further, the cross-linkable nitrile rubber composition of the present invention may include, in addition to the above components, compounding agents usually used in the field of rubber such as a reinforcing agent such as carbon black or silica, a filler such as calcium carbonate, talc or clay, a metal oxide such as zinc oxide or magnesium oxide, an α,β-ethylenically unsaturated carboxylic acid metal salt such as zinc methacrylate or zinc acrylate, a co-cross-linking agent, a cross-linking aid, a cross-linking retarder, an anti-aging agent, an antioxidant, a light stabilizer, a scorch retarder such as a primary amine, an activating agent such as diethylene glycol, a coupling agent, a plasticizer, a processing aid, a slip agent, an adhesive, a lubricant, a flame retardant, an antifungal agent, an acid acceptor, an antistatic agent, a pigment, and a foaming agent. The amounts of these compounding agents are not particularly limited and the compounding agents can be compounded in the amounts according to the compounding purposes so long as the compounding amounts are within ranges not impairing the object and the effects of the present invention.

As the coupling agent, a silane coupling agent, an aluminum-based coupling agent, a titanate-based coupling agent, etc. may be mentioned.

The silane coupling agent is not particularly limited, but as specific examples thereof, sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)disulfane; epoxy group-containing silane coupling agents such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, 3-triethoxysilyl-N-(1,3-dimethylbutylidene)propylamine, and N-phenyl-3-aminopropyltrimethoxysilane; (meth)acryloxy group-containing silane coupling agents such as γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatopropyltriethoxysilane; styryl group-containing silane coupling agents such as p-styryltrimethoxysilane; ureido group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; and alkyl group-containing silane coupling agents such as isobutyltrimethoxysilane and cyclohexylmethyldimethoxysilane; etc. may be mentioned.

The aluminum-based coupling agent is not particularly limited, but as specific examples thereof, acetoalkoxyaluminum diisopropylate, etc. may be mentioned.

The titanate-based coupling agent is not particularly limited, but as specific examples thereof, isopropyltriisostearoyl titanate, isopropyltris(dioctylpyrophosphate) titanate, isopropyltri(N-aminoethyl-aminoethyl) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate, bis(dioctylpyrophosphate)ethylene titanate, tetraisopropylbis(dioctylphosphite) titanate, isopropyltriisostearoyl titanate, etc. may be mentioned. These silane coupling agents, aluminum-based coupling agents, titanate-based coupling agents and the like may be used as single types or a plurality of types combined.

As carbon black, furnace black, acetylene black, thermal black, channel black, austin black, graphite, etc. may be mentioned. These may be used as single types or a plurality of types combined.

As silica, natural silica such as quartz powder and silica stone powder; synthetic silica such as silicic anhydride (such as silica gel and aerosil) and hydrous silicic acid; etc. may be mentioned, and among these, synthetic silica is preferable. Further, these silicas may be surface treated with a coupling agent or the like. As the coupling agent to be used for the surface treatment, the above-mentioned coupling agents may be used.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as triallyl isocyanurate and trimethallyl isocyanurate; cyanurates such as triallylcyanurate; maleimides such as N,N'-m-phenylenedimaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated regal resin; and 3 to 5-functional methacrylate compounds and acrylate compounds such as trimethylolpropane trimethacrylate and trimethylolpropane triacrylate; etc. may be mentioned. These may be used as single types or a plurality of types combined.

The plasticizer is not particularly limited, but possible to use a trimellitic acid-based plasticizer, a pyromellitic acid-based plasticizer, an ether ester-based plasticizer, a polyester-based plasticizer, a phthalic acid-based plasticizer, an adipic acid ester-based plasticizer, a phosphoric acid ester-based plasticizer, a sebacic acid ester-based plasticizer, an alkylsulfonic acid ester compound plasticizer, and an epoxidized vegetable oil-based plasticizer can be used. As specific examples, tri-2-ethylhexyl trimellitate, trimellitic acid isononyl ester, trimellitic acid mixed linear alkyl ester, dipentaerythritol ester, pyromellitic acid 2-ethylhexyl ester, polyether ester (molecular weight: approximately 300 to 5000), adipic acid bis[2-(2-butoxyethoxy)ethyl], dioctyl adipate, adipic acid-based polyester (molecular weight: approximately 300 to 5000), dioctyl phthalate, diisononyl phthalate, dibutyl phthalate, tricresyl phosphate, dibutyl alkylsulfonic acid phenyl ester, epoxidized soybean oil, diheptanoate, di-2-ethyl hexanoate, didecanoate, etc. may be mentioned. These may be used as single types or a plurality of types combined.

Furthermore, the cross-linkable rubber composition of the present invention may contain rubber other than the above-mentioned nitrile group-containing highly saturated copolymer rubber of the present invention in a range where the effects of the present invention are not obstructed.

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluororubber, urethane rubber, chloroprene rubber, silicone rubber, natural rubber, polyisoprene rubber, etc. may be mentioned.

When the cross-linkable rubber composition of the present invention contains rubber other than the nitrile group-containing highly saturated copolymer rubber of the present invention, the amount of the rubber contained in the cross-linkable rubber composition is preferably 30 parts by weight or less, more preferably 20 parts by weight or less, and still more preferably 10 parts by weight or less, in relation to 100 parts by weight of the nitrile group-containing highly saturated copolymer rubber of the present invention.

Further, the cross-linkable rubber composition of the present invention is prepared by mixing the above-mentioned ingredients preferably in a nonaqueous system. The method for preparing the cross-linkable rubber composition of the present invention is not limited, but the cross-linkable rubber composition of the present invention can be usually prepared as follows: the ingredients other than the cross-linking agent and the ingredients unstable against heat are subjected to a primary kneading with a mixing machine such as a Banbury mixer, an internal mixer or a kneader; then the kneaded mixture is transferred to an open roll or the like, and the cross-linking agent and the ingredients unstable against heat are added to the kneaded mixture, and then the resulting mixture is subjected to a secondary kneading to prepare the cross-linkable rubber composition. Note that the primary kneading is usually performed at 10 to 200° C. and preferably at 30 to 180° C. for 1 minute to 1 hour and preferably 1 minute to 30 minutes, and the secondary kneading is usually performed at 10 to 90° C., and preferably at 20 to 60° C., for 1 minute to 1 hour and preferably 1 minute to 30 minutes.

Cross-Linked Rubber

The cross-linked rubber of the present invention is obtained by cross-linking the above cross-linkable rubber composition of the present invention.

The cross-linked rubber of the present invention can be produced as follows: the cross-linkable rubber composition of the present invention is used, the composition formed by using a forming machine corresponding to the desired shape, such as an extruder, an injection molding machine, a compressor, or a roll, the cross-linking reaction is performed by heating the formed product, and thus the shape of the formed product is fixed to produce the cross-linked rubber. In this case, the cross-linking may be performed after preliminarily performing the forming, or alternatively, the forming and the cross-linking may also be performed simultaneously. The forming temperature is usually 10 to 200° C., and preferably 25 to 120° C. The cross-linking temperature is usually 100 to 200° C. and preferably 130 to 190° C., and the cross-linking time is usually 1 minute to 24 hours and preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The thus obtained cross-linked rubber of the present invention is obtained by using the above nitrile group-containing highly saturated copolymer rubber of the present invention, and is excellent in the cold resistance, the resistance to swelling in oil (small volume change in oil), and the resistance to hardening in oil (small hardness change in an oil containing a condensed aromatic compound).

Therefore, the cross-linked rubber of the present invention, taking advantage of such a characteristic, can be used for various seal members such as O-rings, packings, diaphragms, oil seals, shaft seals, bearing seals, well head seals, shock absorber seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventer), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator gaskets which are attached between pairs of housings straddling unit cells provided with positive electrodes, electrolyte plates, and negative electrodes, and top cover gaskets for hard disk drives; various types of rolls such as printing rolls, ironmaking rolls, papermaking rolls, industrial rolls, and office equipment rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuit beards or other binders, fuel cell separators and also other broad applications in the electronics field.

EXAMPLES

Hereinafter, the present invention will be described specifically by way of Examples and Comparative Examples. In what follows, unless otherwise specified, "parts" are based on weight. Note that the tests and the evaluations were carried out as follows.

Content of Carboxyl Group

To 0.2 g of a 2-mm square piece of a nitrile group-containing highly saturated copolymer rubber, 100 mL of 2-butanone was added. The mixture was stirred for 16 hours, and then 20 mL of ethanol and 10 of water were added to the mixture. While stirring, a titration was performed at room temperature by using a 0.02N hydrous ethanol solution of potassium hydroxide, and thymolphthalein as an indicator, and thus the content of the carboxyl group was determined as the number of moles of the carboxyl group in 100 g of rubber (units: ephr).

Iodine Value

The iodine value of the nitrile group-containing highly saturated copolymer rubber was measured in accordance with JIS K 6235.

Composition of Nitrile Group-Containing Highly Saturated Copolymer Rubber

The contents of the respective monomer units constituting the nitrile group-containing highly saturated copolymer rubber were measured by the following method.

Specifically, the content of the mono-n-butyl maleate unit was calculated as follows: the number of moles of the carboxyl group with respect to 100 g of the nitrile group-containing highly saturated copolymer rubber after hydrogenation was determined by the above-mentioned method for measuring "the content of the carboxyl group," and then the determined number of moles was converted into the content of the mono-n-butyl maleate unit.

The content of the 1,3-butadiene unit (including the hydrogenated fraction) and the content of the isoprene unit (including the hydrogenated fraction) were measured by the following method. Specifically, first, the iodine value of the nitrile group-containing highly saturated copolymer rubber before hydrogenation reaction was measured by the above-mentioned method, thus the total content of these units was calculated, and then the weight ratio between these units was determined by performing a $^1$H-NMR measurement to derive the contents of these units.

The content of the acrylonitrile unit was calculated by measuring the nitrogen content in the nitrile group-containing highly saturated copolymer rubber after hydrogenation by the Kjeldahl method in accordance with JIS K6384.

The content of the methoxyethyl acrylate unit and the n-butyl acrylate unit was calculated as the balance of the above respective monomer units.

Resistance to Swelling in Oil Test

The cross-linkable rubber composition was placed in a mold of 15 cm in length, 15 cm in width and 0.2 cm in depth, and was press-formed at 170° C., for 20 minutes while being pressurized at a press pressure of 10 MPa, and thus a sheet-shaped cross-linked product was obtained. Then, the obtained cross-linked product was transferred to a gear oven and subjected to a secondary cross-linking at 170° C. for 4 hours to prepare a sheet-shaped cross-linked rubber. In accordance with JIS K6258, a resistance to swelling in oil test was performed by immersing the obtained sheet-shaped cross-linked rubber in a test fuel oil (Fuel C: a mixture of isooctane:toluene=50:50 (volume ratio)) regulated at 40° C. for 168 hours.

In the resistance to swelling in oil test, the volumes of the cross-linked rubber before and after the immersion in the fuel oil were measured, the volume swelling rate $\Delta V$ (unit: %) after the immersion in the fuel oil was calculated according to "$\Delta V$=([volume after immersion in fuel oil–volume before immersion in fuel oil]/volume before immersion in fuel oil)×100," and the resistance to swelling in oil was evaluated on the basis of the volume swelling rate $\Delta V$. The smaller the volume swelling rate $\Delta V$, the more excellent the resistance to swelling in oil.

Resistance to Hardening in Oil Test

A sheet-shaped cross-linked rubber was prepared in the same manner as in the resistance to swelling oil test. In addition to this cross-linked rubber, a phenanthrene-containing test fuel oil was prepared by dissolving phenanthrene in a content of 10 wt % in a liquid mixture (Fuel C:ethanol=80:20 (volume ratio)) composed of Fuel C (a mixture of isooctane:toluene=50:50 (volume ratio)) and ethanol.

Further, for the sheet-shaped cross-linked rubber obtained as described above, a measurement of the hardness was performed in accordance with JIS K6253 by using an international rubber hardness tester (IRDH method). Next, in the phenanthrene-containing test fuel oil prepared as described above, the sheet-shaped cross-linked rubber obtained as described above was immersed at 60° C. for 168 hours; then the cross-linked rubber was taken out from the phenanthrene-containing test fuel oil, dried at 120° C. for 3 hours, allowed to stand still at room temperature for 24 hours, and then again subjected to a hardness measurement under the sane conditions as described above. Then, the hardness change $\Delta Hs$ was determined according to "hardness change $\Delta Hs$=hardness after immersion in fuel oil–hardness before immersion in fuel oil." It is possible to evaluate that the smaller the absolute value of the hardness change $\Delta Hs$, the smaller the increase of the hardness due to the immersion in the test fuel oil, and the cross-linked rubber is excellent in the resistance to hardening in oil.

Cold Resistance Test (TR Test)

A sheet-shaped cross-linked rubber was obtained in the same manner as in the resistance to swelling in oil test, and the cold resistance of the cross-linked rubber was measured in accordance with JIS K6261 by the TR test (low temperature elasticity recovery test). Specifically, an extended cross-linked rubber was frozen, then the recoverability of the extended cross-linked rubber was measured by continuously increasing the temperature, and the temperature TR10 at which the length of the test piece was contracted (recovered) by 10% due to the temperature increase measured. It is possible to evaluate that the lower TR10, the more excellent in the cold resistance of the cross-linked rubber.

Production Example 1 (Production of Nitrile Group-Containing Highly Saturated Copolymer Rubber (n1)

In a reactor, 180 parts of ion exchanged water, 25 parts of an aqueous solution of sodium dodecylbenzenesulfonate having a concentration of 10%, 26 parts of acrylonitrile, 18 parts of n-butyl acrylate, 6 parts of mono-n-butyl maleate, and 0.75 part of t-dodecyl mercaptan (molecular weight adjuster) were added in the mentioned order, the gas inside the reactor was replaced with nitrogen three tines, and then 26.5 parts of 1,3-butadiene and 23.5 parts of isoprene were placed in the reactor. Then, the reactor was held at 10° C., 0.1 part of cumene hydroperoxide (polymerization initiator) and suitable amounts of a reducing agent and a chelating agent were placed in the reactor, and the polymerization reaction was continued while the reaction mixture was being stirred; at the time when the polymerization conversion rate reached 80%, 0.1 part of an aqueous solution of hydroquinone (terminator) having a concentration of 10 wt % was added to terminate the polymerization reaction. Next, the residual monomers were removed at a water temperature of 60° C., to obtain a latex (solid content concentration: 25 wt. %) of a nitrile group-containing copolymer rubber (X1).

Then, in an autoclave, the latex of the nitrile rubber (X1) and a palladium catalyst (a solution prepared by mixing 1 wt % palladium acetate acetone solution and an equal weight of ion exchanged water) were added in such a way that the content of palladium was 8,000 ppm in relation to the dry weight of the rubber contained in the latex of the nitrile rubber (X1) obtained as described above; then, a hydrogenation reaction was performed at a hydrogen pressure of 3 MPa and a temperature of 50° C. for 6 hours to obtain a latex of a nitrile group-containing highly saturated copolymer rubber (n1).

To the obtained latex of the nitrile group-containing highly saturated copolymer rubber (n1), two times volume of methanol was added to coagulate the latex, and then the resulting mixture was vacuum dried at 60° C. for 12 hours to thereby obtain the nitrile group-containing highly saturated copolymer rubber (n1). The iodine value of the obtained nitrile group-containing highly saturated copolymer rubber (n1) was 22. The Obtained nitrile group-containing highly saturated copolymer rubber (n1) included 27 wt % of the acrylonitrile unit, 18 wt % of the isoprene unit (including the hydrogenated fraction), 33 wt % of the butadiene unit (including the hydrogenated fraction), 15 wt % of the n-butyl acrylate unit, and 7 wt % of the mono-n-butyl maleate unit.

Production Examples 2 to 24 (Production of Nitrile Group-Containing Highly Saturated Copolymer Rubbers (n2) to (n24)

The nitrile group-containing highly saturated copolymer rubbers (n2) to (n24) were obtained in the same manner as in Production Example 1 except that the types and the amounts of the monomers used for the polymerization were altered as shown in Table 1 and Table 2. Table 1 and Table 2 show the iodine values and the monomer compositions of the obtained nitrile group-containing highly saturated copolymer rubbers (n2) to (n24). To be noted that the polymerization conversion rates of the polymerization reactions and the amounts of the palladium catalysts for the hydrogenation reactions were altered as shown in Table 1 and Table 2.

Further, in the case where methoxyethyl acrylate was mixed, the timing of the addition of methoxyethyl acrylate was set at a time after the addition of acrylonitrile; and in the case where methoxyethyl acrylate and mono-n-butyl maleate were mixed, the timing of the addition of these was set at a time after the addition of acrylonitrile, and methoxyethyl acrylate and mono-n-butyl maleate were added in the mentioned order.

Example 1

Using a Banbury mixer, the following ingredients were added to and kneaded with 100 parts of the nitrile group-containing highly saturated copolymer rubber (n1) obtained in Production Example 1: 50 parts of an FEF carbon (trade name "Seast SO," made by Tokai Carbon Co., Ltd., carbon black), 1 part of tri-2-ethylhexyl trimellitate (trade name "Adekacizer C-8," made by ADEKA Corporation, plasticizer), 1 part of trimellitic acid isononyl ester (trade name "Adekacizer C-9N," made by ADEKA Corporation), 1 part of a polyether ester-based plasticizer (trade name "Adekacizer RS-700," made by ADEKA Corporation), 1 part of a polyether ester-based plasticizer (trade name "Adekacizer RS-735," made by ADEKA Corporation), 1 part of an adipic acid ether ester-based plasticizer (trade name "Adekacizer RS107," made by ADEKA Corporation), 1 part of stearic acid, 1 part of a polyoxyethylene alkyl ether phosphoric acid ester (trade name "Phosphanol RL210," made by Toho Chemical Industry Co., Ltd., processing aid), and 1.5 parts of 4,4'-di-(α,α'-dimethylbenzyl)diphenylamine (trade name "Nocrac CD," made by Ouchi Shinko Chemical Industrial Co., Ltd., antiaging agent). Next, the resulting mixture was transferred to a roll, 4 parts of 1,8-diazabicyclo[5,4,0]undecene-7 (DBU) (trade name "RHENOGRAN XLA-60 (GE2014)," made by Rhein Chemie Corporation, product composed of 60 wt % of DBU (including a fraction being zinc dialkyldiphosphate salt), and acrylic acid polymer and 40 wt % of a dispersant, basic cross-linking accelerator,) and 2.6 parts of hexamethylene diamine carbamate (trade name "Diak #1," made by Du Pont Corporation, polyamine-based cross-linking agent belonging to aliphatic polyvalent amines) were added to the mixture, and the mixture was kneaded to obtain a cross-linkable rubber composition.

A cross-linked rubber was obtained by using the above-mentioned method and by using the above prepared cross-linkable rubber composition, and the obtained cross-linked rubber was subjected to the resistance to hardening in oil test, the resistance to swelling in oil test, and the cold resistance test. The results thus obtained are shown in Table 1.

Examples 2 to 10

Cross-linkable rubber compositions were obtained in the same manner as in Example 1 except that the nitrile group-containing highly saturated copolymer rubbers (n2) to (n10) obtained in Production Examples 2 to 10 were used in place of the nitrile group-containing highly saturated copolymer rubber (n1) obtained in Production Example 1, and the obtained cross-linkable rubber compositions were evaluated in the same manner as in Example 1. The results thus obtained are shown in Table 1. Note that the amount of hexamethylene diamine carbamate as a cross-linking agent was varied in proportion with the mono-n-butyl maleate unit.

Example 11

By using a Banbury mixer, the following in is were added to and kneaded with 100 parts of the nitrile group-containing highly saturated copolymer rubber (n11) obtained in Production Example 11, 50 parts of an FEF carbon (trade name "Seast SO," made by Tokai Carbon Co., Ltd., carbon black), 1 part of tri-2-ethylhexyl trimellitate (trade name "Adekacizer Cizer C-8," made by ADEKA Corporation, plasticizer), 1 part of trimellitic acid isononyl ester (trade name "Adekacizer C-9N," made by ADEKA Corporation), 1 part of a polyether ester-based plasticizer (trade name "Adekacizer RS-700," made by ADEKA Corporation), 1 part of a polyether ester-based plasticizer (trade name "Adekacizer RS-735," made by ADEKA Corporation), 1 part of an adipic acid ether ester-based plasticizer (trade name "Adekacizer PS-107," made by ADEKA Corporation), 1 part of stearic acid (cross-linking aid), 5 parts of zinc oxide (two types of zinc flowers, made by Seido Chemical industry Co., Ltd.), 1.5 parts of 4,4'-di-(α,α'-dimethylbenzyl)diphenylamine (trade name "Nocrac CD," made by Ouchi Shinko Chemical Industrial Co., Ltd., antiaging agent), and 1.5 parts of zinc salt of 2-mercaptobenzimidazole (trade name "Nocrac MBZ," made by Ouchi Shinko Chemical Industrial Co., Ltd., antiaging agent). Next, the resulting mixture was transferred to a roll, 8.0 parts of 1,3-bis(t-butylperoxyisopropyl)benzene (40% product) (trade name "Vul-Cup 40KE," made by Arkoma Inc., organic peroxide cross-linking agent) was added to the mixture, and the mixture was kneaded to obtain a cross-linkable rubber composition.

A cross-linked rubber was obtained by using the above-mentioned method and by using the above prepared cross-linkable rubber composition, and the obtained cross-linked rubber was subjected to the resistance to hardening in oil test, the resistance to swelling in oil test, and the cold resistance test. The results thus obtained are shown in Table 1.

Examples 12 to 18

Cross-linkable rubber compositions were obtained in the same manner as in Example 11 except that the nitrile group-containing highly saturated copolymer rubbers (n12) to (n18) obtained in Production Examples 12 to 18 were used in place of the nitrile group-containing highly saturated copolymer rubber (n11) obtained in Production Example 11, and the obtained cross-linkable rubber compositions were evaluated in the same manner as in Example 11. The results thus obtained are shown in Table 1 and Table 2.

Comparative Examples 1 to 3

Cross-linkable rubber compositions were obtained in the same manner as in. Example 1 except that the nitrile group-containing highly saturated copolymer rubbers (n19) to (n21) obtained in Production Examples 1.9 to 21 were used in place of the nitrile group-containing highly saturated copolymer rubber (n1) obtained in Production Example 1, and the obtained cross-linkable rubber compositions were evaluated in the same manner as in Example 1. The results obtained are shown in Table 2. Note that the amount of hexamethylene diamine carbamate as a cross-linking agent was varied in proportion with the mono-n-butyl maleate unit.

Comparative Examples 4 to 6

Cross-linkable rubber compositions were obtained in the same manner as in Example 11 except that the nitrile group-containing highly saturated copolymer rubbers (n22) to (n24) obtained in Production Examples 22 to 24 were used in place of the nitrile group-containing highly saturated copolymer rubber (n11) obtained in Production Example 11, and the obtained cross-linkable rubber compositions were evaluated in the same manner as in Example 11. The results thus obtained are shown in Table 2.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Type of nitrile group-containing highly saturated copolymer rubber | | (n1) | (n2) | (n3) | (n4) | (n5) | (n6) | (n7) | (n8) | (n9) | (n10) | (n11) | (n12) |
| Monomers used for polymerisation | | | | | | | | | | | | | |
| Acrylonitrile | (parts) | 26 | 26 | 23 | 23 | 23 | 23 | 20 | 20 | 20 | 20 | 23 | 23 |
| Isoprene | (parts) | 23.5 | 37 | 14 | 18.5 | 27.5 | 38 | 16.5 | 23 | 29 | 39 | 16.5 | 21.5 |
| 1,3-Butadiene | (parts) | 26.5 | 13 | 24 | 19.5 | 10.5 | | 22.5 | 16 | 10 | | 25 | 20 |
| Methoxyethyl acrylate | (parts) | | | 33 | 33 | 33 | 33 | | | | | 35.5 | 35.5 |
| n-Butyl acrylate | (parts) | 18 | 18 | | | | | 35.5 | 35.5 | 35.5 | 35.5 | | |
| Mono-n-butyl maleate | (parts) | 6 | 6 | 6 | 6 | 6 | 6 | 5.5 | 5.5 | 5.5 | 5.5 | | |
| Polymerization conversion rate | (%) | 80 | 80 | 80 | 80 | 80 | 75 | 80 | 80 | 80 | 75 | 80 | 80 |
| Amount of use of palladium catalyst during hydrogenation reaction | (ppm) | 8000 | 12000 | 7000 | 10000 | 7000 | 10000 | 5000 | 10000 | 12000 | 10000 | 7000 | 12000 |
| Monomer composition of nitrile group-containing highly saturated copolymer rubber | | | | | | | | | | | | | |
| Acrylonitrile unit | (wt %) | 27 | 27 | 24 | 24 | 24 | 24 | 21 | 21 | 21 | 21 | 24 | 24 |
| Isoprene unit (including saturated fraction) | (wt %) | 18 | 35 | 16 | 22 | 33 | 46 | 15 | 23 | 31 | 43 | 20 | 26 |

TABLE 1-continued

|  |  | Example |  |  |  |  |  |  |  |  |  |  |  |
|---|---|---|---|---|---|---|---|---|---|---|---|---|---|
|  |  | 1 | 2 | 3 | 4 | 5 | 6 | 7 | 8 | 9 | 10 | 11 | 12 |
| 1,3-Butadiene unit (including saturated fraction) | (wt %) | 33 | 16 | 30 | 24 | 13 |  | 28 | 20 | 12 |  | 31 | 25 |
| Methoxyethyl acrylate unit | (wt %) |  |  | 23 | 23 | 23 | 23 |  |  |  |  | 25 | 25 |
| n-Butyl acrylate unit | (wt %) | 15 | 15 |  |  |  |  | 30 | 30 | 30 | 30 |  |  |
| Mono-n-butyl maleate unit | (wt %) | 7 | 7 | 7 | 7 | 7 | 7 | 6 | 6 | 6 | 6 |  |  |
| Proportion of isoprene unit in conjugated diene monomer unit | (wt %) | 35.3 | 68.6 | 34.8 | 47.8 | 71.7 | 100 | 34.9 | 53.5 | 72.1 | 100 | 39.2 | 51 |
| Iodine value of nitrite group-containing highly saturated copolymer rubber |  | 22 | 10 | 20 | 10 | 32 | 19 | 46 | 17 | 10 | 19 | 38 | 11 |
| Resistance to swelling in oil test |  |  |  |  |  |  |  |  |  |  |  |  |  |
| Volume swelling rate ΔV | (%) | 69 | 70 | 56 | 56 | 56 | 56 | 80 | 80 | 80 | 80 | 65 | 65 |
| Resistance to hardening in oil test |  |  |  |  |  |  |  |  |  |  |  |  |  |
| Hardness change ΔHs |  | −6 | −6 | −6 | −6 | −6 | −6 | −6 | −6 | −6 | −6 | −6 | −6 |
| Cold resistance test |  |  |  |  |  |  |  |  |  |  |  |  |  |
| TR10 | (° C.) | −22 | −16 | −22 | −19 | −16 | −12 | −28 | −24 | −21 | −18 | −28 | −25 |

TABLE 2

|  |  | Example |  |  |  |  |  | Comparative Example |  |  |  |  |  |
|---|---|---|---|---|---|---|---|---|---|---|---|---|---|
|  |  | 13 | 14 | 15 | 16 | 17 | 18 | 1 | 2 | 3 | 4 | 5 | 6 |
| Type of nitrile group-containing highly saturated copolymer rubber |  | (n13) | (n14) | (n15) | (n16) | (n17) | (n18) | (n19) | (n20) | (n21) | (n22) | (n23) | (n24) |
| Monomers used for polymerisation |  |  |  |  |  |  |  |  |  |  |  |  |  |
| Acrylonitrile | (parts) | 23 | 23 | 23 | 23 | 23 | 23 | 35 | 26 | 20 | 31 | 26 | 23 |
| Isoprene | (parts) | 28.5 | 41.5 | 18 | 22 | 29.5 | 41.5 | 30 |  | 70.5 | 38 | 11 | 46.5 |
| 1,3-Butadiene | (parts) | 13 |  | 23.5 | 19.5 | 12 |  | 10.5 | 37.5 |  |  | 34.5 | 30.5 |
| Methoxyethyl acrylate | (parts) | 35.5 | 35.5 |  |  |  |  |  |  |  | 31 | 28.5 |  |
| n-Butyl acrylate | (parts) |  |  | 35.5 | 35.5 | 35.5 | 35.5 | 19 | 32 | 6 |  |  |  |
| Mono-n-butyl maleate | (parts) |  |  |  |  |  |  | 5.5 | 4.5 | 3.5 |  |  |  |
| Polymerization conversion rate | (%) | 80 | 75 | 80 | 80 | 80 | 75 | 80 | 80 | 75 | 75 | 80 | 80 |
| Amount of use of palladium catalyst during hydrogenation reaction | (ppm) | 12000 | 10000 | 7000 | 15000 | 12000 | 10000 | 15000 | 10000 | 7000 | 7000 | 10000 | 10000 |
| Monomer composition of nitrile group-containing highly saturated copolymer rubber |  |  |  |  |  |  |  |  |  |  |  |  |  |
| Acrylonitrile unit | (wt %) | 24 | 24 | 24 | 24 | 24 | 24 | 36 | 27 | 21 | 32 | 27 | 24 |
| Isoprene unit (including saturated fraction) | (wt %) | 35 | 51 | 17 | 22 | 31 | 46 | 29 |  | 70 | 46 | 10 | 38 |
| 1,3-Butadiene unit (including saturated fraction) | (wt %) | 16 |  | 29 | 24 | 15 |  | 13 | 41 |  |  | 43 | 38 |
| Methoxyethyl acrylate unit | (wt %) | 25 | 25 |  |  |  |  |  |  |  | 22 | 20 |  |
| n-Butyl acrylate unit | (wt %) |  |  | 30 | 30 | 30 | 30 | 16 | 27 | 5 |  |  |  |
| Mono-n-butyl maleate unit | (wt %) |  |  |  |  |  |  | 6 | 5 | 4 |  |  |  |
| Proportion of isoprene unit in conjugated diene monomer unit | (wt %) | 68.6 | 100 | 37 | 47.8 | 67.4 | 100 | 69 | 0 | 100 | 100 | 18.9 | 50 |
| Iodine value of nitrite group-containing highly saturated copolymer rubber |  | 18 | 28 | 55 | 11 | 18 | 28 | 7 | 7 | 28 | 50 | 12 | 11 |

TABLE 2-continued

|  |  | Example | | | | | | Comparative Example | | | | | |
| --- | --- | --- | --- | --- | --- | --- | --- | --- | --- | --- | --- | --- | --- |
|  |  | 13 | 14 | 15 | 16 | 17 | 18 | 1 | 2 | 3 | 4 | 5 | 6 |
| Resistance to swelling in oil test | | | | | | | | | | | | | |
| Volume swelling rate ΔV | (%) | 65 | 65 | 88 | 89 | 89 | 89 | 48 | 62 | 104 | 56 | 63 | 100 |
| Resistance to hardening in oil test | | | | | | | | | | | | | |
| Hardness change ΔHs |  | −6 | −6 | −6 | −6 | −6 | −6 | −5 | 11 | −7 | −7 | 8 | −6 |
| Cold resistance test | | | | | | | | | | | | | |
| TR10 | (° C.) | −22 | −17 | −29 | −27 | −24 | −19 | −4 | −25 | −24 | −7 | −28 | −28 |

As can be seen from Table 1 and Table 2, the cross-linked rubbers obtained by using the nitrile group-containing highly saturated copolymer rubbers in which the content of the α,β-ethylenically unsaturated nitrile monomer unit (a), the content of the α,β-ethylenically unsaturated monocarboxylic acid ester monomer unit) (b) and the content of the conjugated diene monomer unit (c), and the iodine value were within the ranges specified in present invention, and the proportion of the isoprene unit in the conjugated diene monomer unit (c) was 33 wt % or more were excellent in cold resistance, additionally small in the volume change in an oil, and in the hardness change in an oil containing a condensed aromatic compound, and excellent in the resistance to swelling in oil, the resistance to hardening in oil, and the cold resistance (Examples 1 to 18).

On the other hand, when the content of the α,β-ethylenically unsaturated nitrile monomer unit (a) was too large, the obtained cross-linked rubbers were found to be inferior in cold resistance (Comparative Examples 1 and 4).

When the proportion of the isoprene unit in the conjugated diene monomer unit (c) was less than 33 wt. %, the hardness change in an oil containing a condensed aromatic compound was large, and was inferior in the resistance to hardening in oil (Comparative Examples 2 and 5).

Moreover, when the α,β-ethylenically unsaturated monocarboxylic acid ester monomer unit (b) was not included, or the content of the α,β-ethylenically unsaturated monocarboxylic acid ester monomer unit (b) vas too small, the cross-linked rubber was large in the volume change in an oil, and was inferior in the resistance to swelling in oil (Comparative Examples 3 and 6).

The invention claimed is:

1. A cross-linkable rubber composition comprising:
   a nitrile group-containing highly saturated copolymer rubber comprising
      an α,β-ethylenically unsaturated nitrile monomer unit (a) in a content of from 15 wt % to less than 28 wt %,
      an α,β-ethylenically unsaturated monocarboxylic acid ester monomer unit (b) in a content of from 15 wt % to 45 wt %, and
      a conjugated diene monomer unit (c) in a content of from 22 wt % to 65 wt %, the conjugated diene monomer unit (c) being at least partially hydrogenated, and a proportion of an isoprene unit in the conjugated diene monomer unit (c) is from 33 wt % to 71.7 wt %; and
   an organic peroxide cross-linking agent,
   wherein
   the organic peroxide cross-linking agent is the only cross-linking agent in the cross-linkable rubber composition,
   the nitrile group-containing highly saturated copolymer rubber has an iodine value of 120 or less, and
   the composition is a nonaqueous composition.

2. The cross-linkable rubber composition according to claim 1, wherein the nitrile group-containing highly saturated copolymer rubber comprises the isoprene unit and a 1,3-butadiene unit as the conjugated diene monomer unit (c).

3. The cross-linkable rubber composition according to claim 1, wherein the nitrile group-containing highly saturated copolymer rubber further comprises a carboxyl group-containing monomer unit (d).

4. The cross-linkable rubber composition according to claim 3, wherein the carboxyl group-containing monomer unit (d) is an α,β-ethylenically unsaturated dicarboxylic acid monoester monomer unit.

5. The cross-linkable rubber composition according to claim 1, wherein the α,β-ethylenically unsaturated monocarboxylic acid ester monomer unit (b) is a (meth)acrylic acid ester having an alkyl group having 1 to 18 carbon atoms.

6. The cross-linkable rubber composition according to claim 1, wherein the α,β-ethylenically unsaturated monocarboxylic acid ester monomer unit (b) is a (meth)acrylic acid ester having an alkoxyalkyl group having 2 to 18 carbon atoms.

7. A cross-linked rubber obtained by cross-linking the cross-linkable rubber composition according to claim 1.

8. The cross-linkable rubber composition according to claim 2, wherein a proportion of the 1,3-butadiene unit in the conjugated diene monomer unit (c) is 15 wt % or more and 67 wt % or less.

9. The cross-linkable rubber composition according to claim 1, wherein the nitrile group-containing highly saturated copolymer rubber consists of the α,β-ethylenically unsaturated nitrile monomer unit (a), the α,β-ethylenically unsaturated monocarboxylic acid ester monomer unit (b), and the conjugated diene monomer unit (c).

* * * * *